INVENTORS
GUILLERMO PEREZ
ELMER H. DREHER
RONALD H. ARTHUR

BY Thomas S. Ross
Albert W. Scribner
ATTORNEYS

Dec. 20, 1960 G. PEREZ ET AL 2,965,170

READER PUNCH UNIT

Filed Dec. 12, 1958 10 Sheets-Sheet 2

INVENTORS
GUILLERMO PEREZ
ELMER H. DREHER
RONALD H. ARTHUR

BY Thomas S. Ross
Albert W. Scribner
ATTORNEYS

Dec. 20, 1960 G. PEREZ ET AL 2,965,170

READER PUNCH UNIT

Filed Dec. 12, 1958 10 Sheets-Sheet 3

INVENTORS
GUILLERMO PEREZ
ELMER H. DREHER
RONALD H. ARTHUR

BY Thomas S. Ross
Albert W. Scribner
ATTORNEYS

Dec. 20, 1960

G. PEREZ ET AL 2,965,170

READER PUNCH UNIT

Filed Dec. 12, 1958

10 Sheets-Sheet 4

INVENTORS
GUILLERMO PEREZ
ELMER H. DREHER
RONALD H. ARTHUR

BY Thomas S. Ross
Albert W. Scribner
ATTORNEYS

Dec. 20, 1960 G. PEREZ ET AL 2,965,170

READER PUNCH UNIT

Filed Dec. 12, 1958 10 Sheets-Sheet 5

INVENTORS
GUILLERMO PEREZ
ELMER H. DREHER
RONALD H. ARTHUR

BY Thomas S. Ross
Albert W. Scribner
ATTORNEYS

INVENTORS
GUILLERMO PEREZ
ELMER H. DREHER
RONALD H. ARTHUR

BY Thomas S. Ross
Albert W. Scribner
ATTORNEYS

INVENTORS
GUILLERMO PEREZ
ELMER H. DREHER
RONALD H. ARTHUR

BY Thomas S. Ross
Albert W. Scribner
ATTORNEYS

Dec. 20, 1960 G. PEREZ ET AL 2,965,170

READER PUNCH UNIT

Filed Dec. 12, 1958 10 Sheets-Sheet 8

INVENTORS
GUILLERMO PEREZ
ELMER H. DREHER
RONALD H. ARTHUR

BY Thomas S. Ross
Albert W. Scribner
ATTORNEYS

INVENTORS
GUILLERMO PEREZ
ELMER H. DREHER
RONALD H. ARTHUR

BY Thomas S. Ross
Albert W. Scribner
ATTORNEYS

INVENTORS
GUILLERMO PEREZ
ELMER H. DREHER
RONALD H. ARTHUR
BY Thomas S. Ross
Albert W. Scribner
ATTORNEYS Patented Dec. 20, 1960

2,965,170

READER PUNCH UNIT

Guillermo Perez, Hartford, Elmer H. Dreher, Bloomfield, and Ronald H. Arthur, West Hartford, Conn., assignors to Royal McBee Corporation, Port Chester, N.Y., a corporation of New York Filed Dec. 12, 1958, Ser. No. 780,076

38 Claims. (Cl. 234—30)

This invention relates to a reader punch unit for data processing equipment and more particularly relates to a novel construction and arrangement therefor. The reader punch unit of the present application is particularly adapted for data processing equipment of the type disclosed in application Serial No. 780,090, filed December 12, 1958 for "Data Processing System."

Most record punch and reader units will accommodate record tapes but will not accommodate a record card, or vice versa. Likewise in many cases the record punch and record reader are separate units each necessitating individual frames, drive means, power means etc., whereby special interconnecting and control apparatus is required in order that said units be cooperable with other business machines such as typewriters, calculating machines and the like.

One object of the present invention is to provide an improved unitary construction and arrangement for a record reader punch unit.

Another object of the invention is to provide an improved reader punch unit which is selectively operable for respectively processing record tapes and record cards.

Another object of the invention is to provide a novel unitary construction and arrangement for a record reader and punch mechanism which utilizes a common frame, common drive means and common power means.

Another object of the invention is to provide an improved reader punch unit which is relatively inexpensive, reliably accurate, and capable of high speed operation when used either as an independent unit or in combination with other data processing machines.

Other objects and attendant advantages of the instant invention will become readily apparent as the disclosure progresses.

Figure 1:
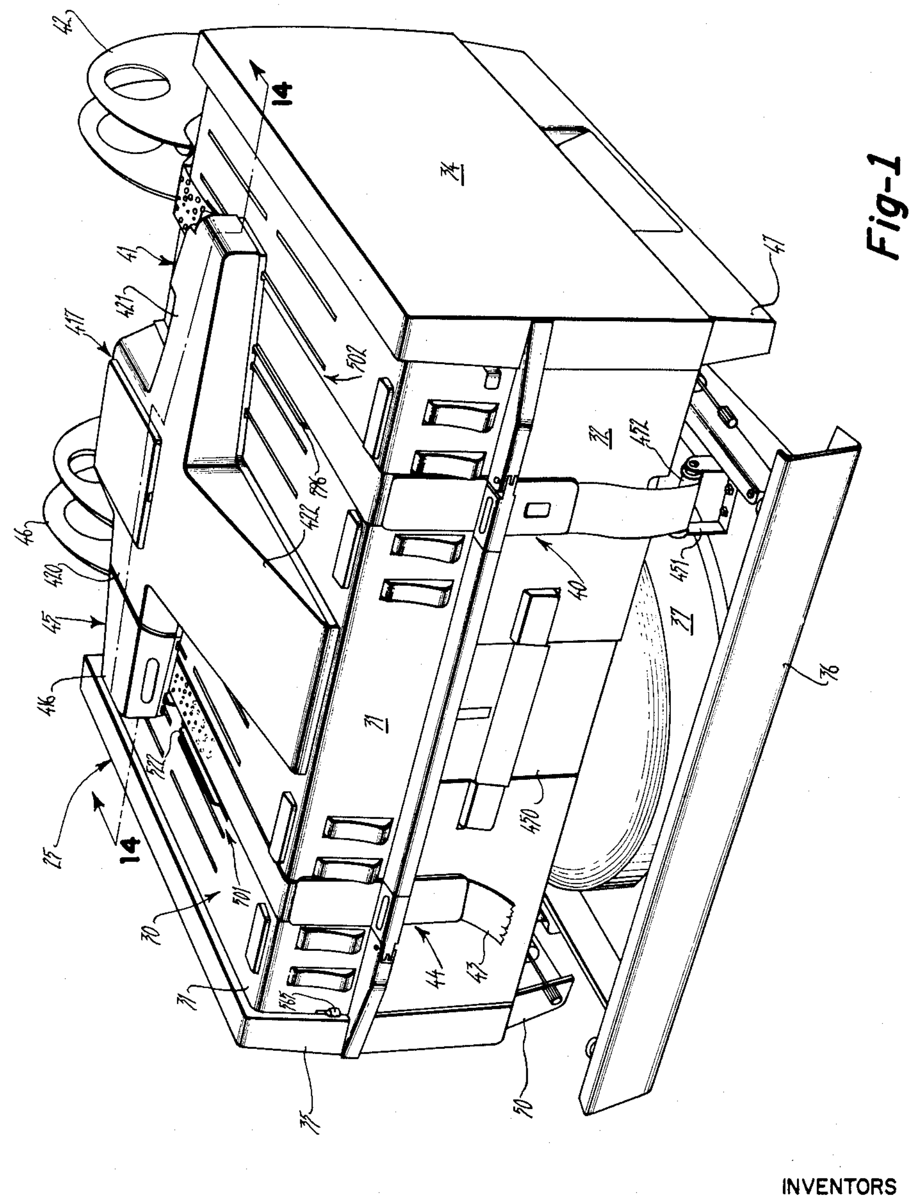
Fig. 1 is an overall perspective view of the reader-punch assembly.
Figure 2:
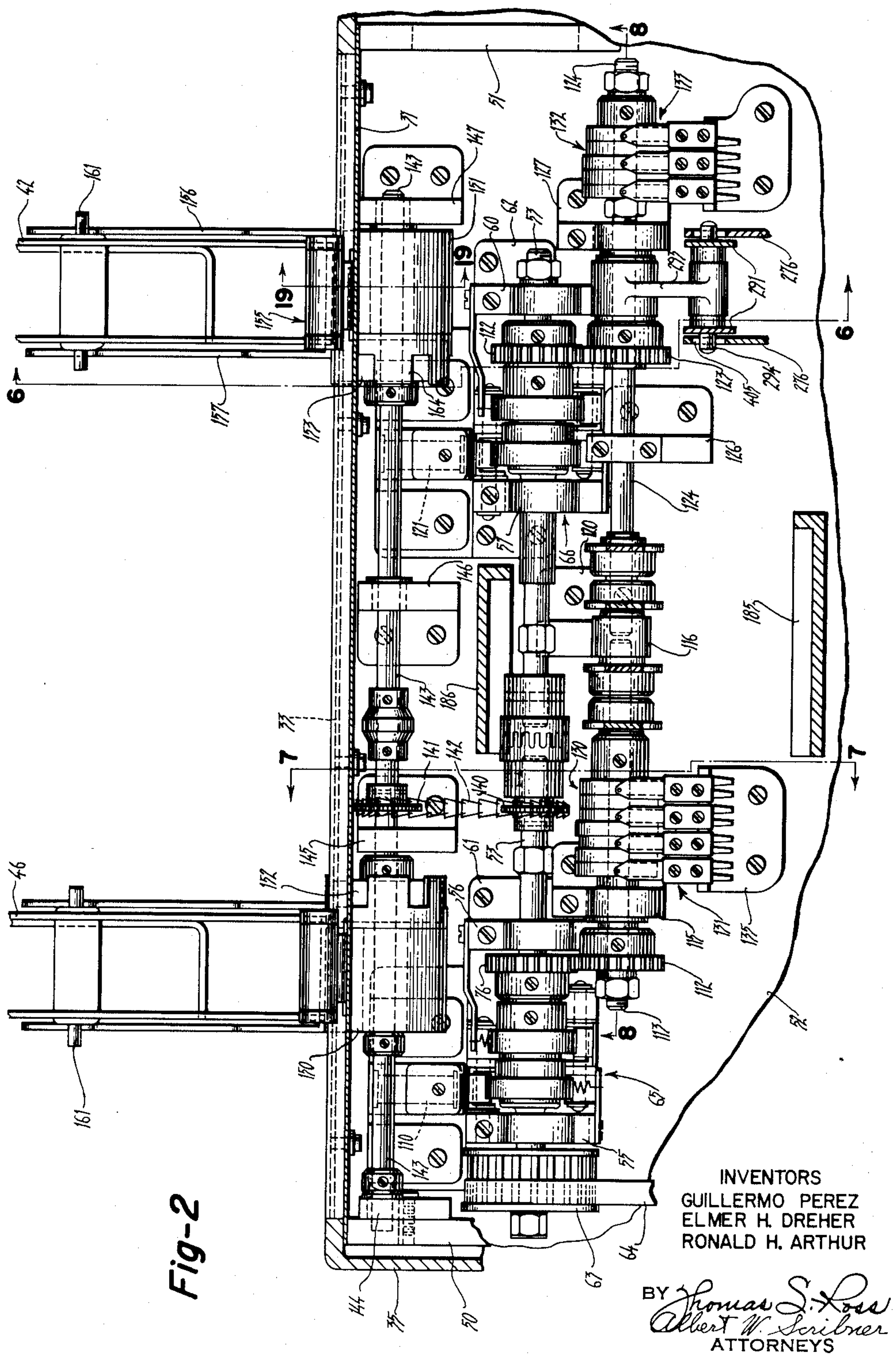
Fig. 2 is a plan view showing the principal drive connections for the reader-punch assembly.
Figure 3:
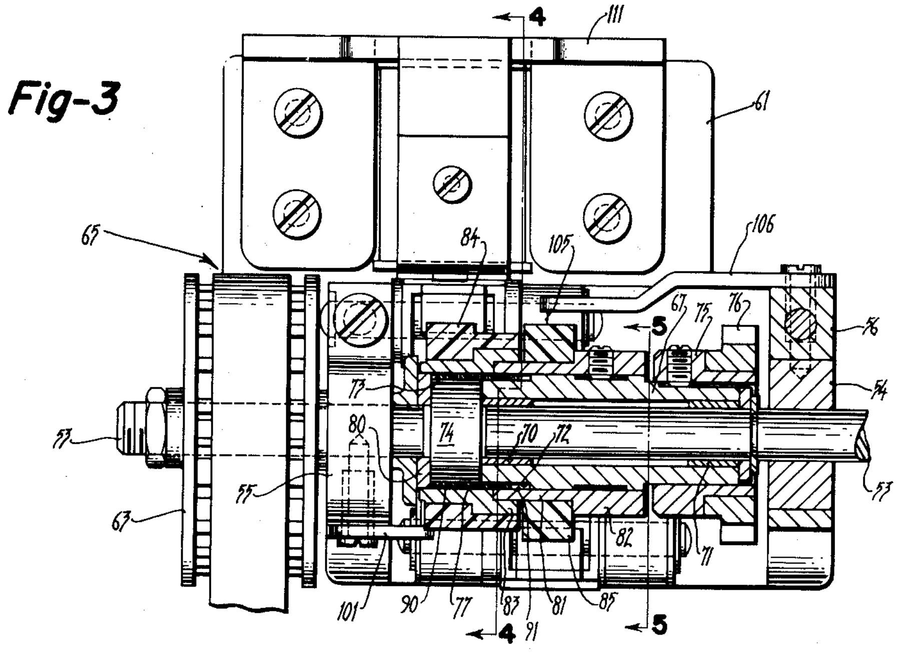
Fig. 3 is a partial axial sectional view showing the construction of one of the wrap spring clutches used in the drive connections of Fig. 2.
Figure 4:
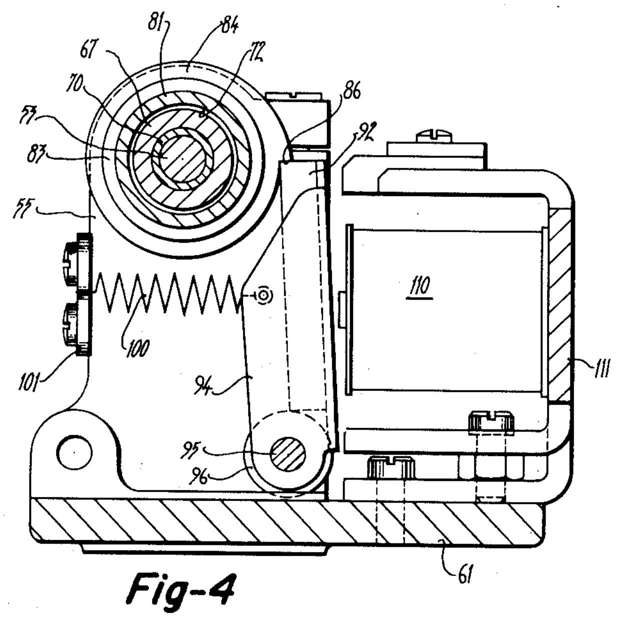
Figure 5:
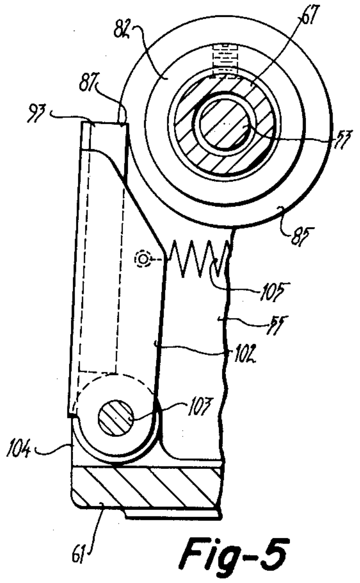
Figure 6:
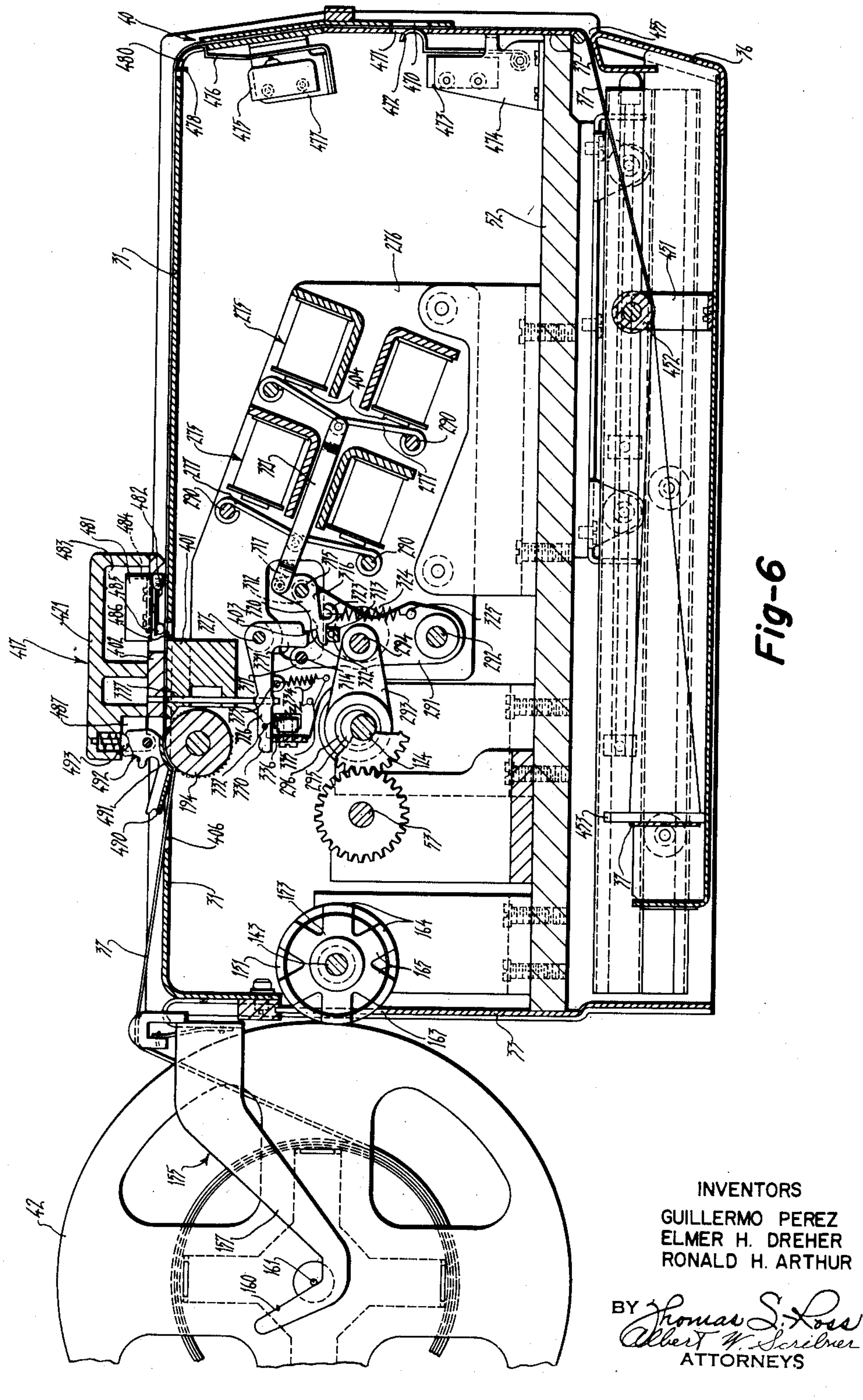
Figure 7:
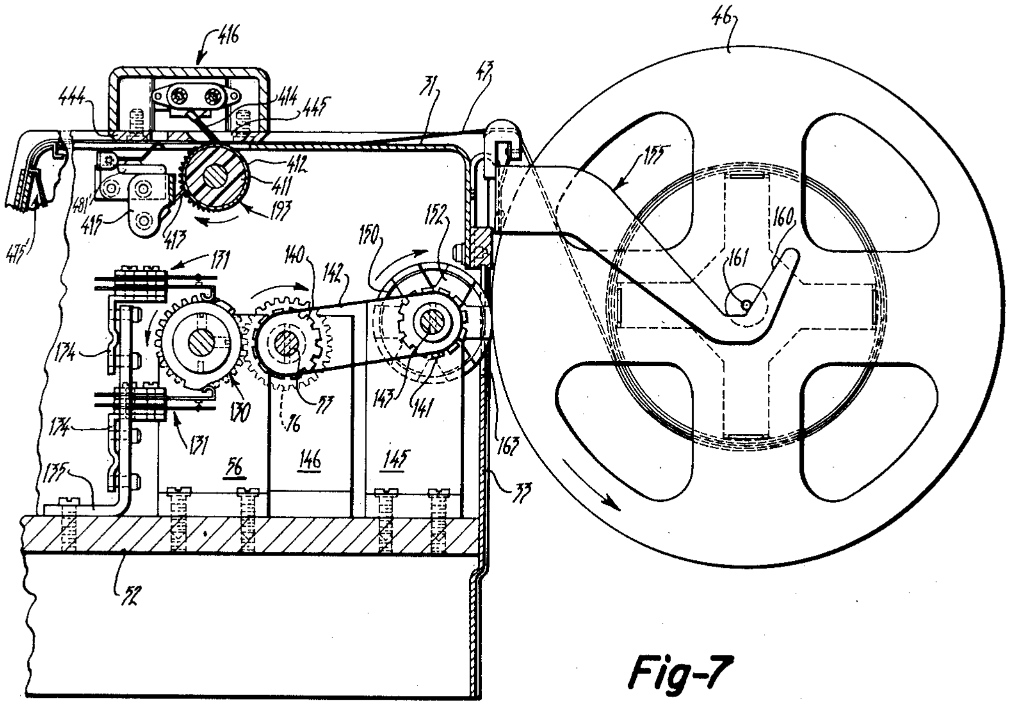
Figure 8:
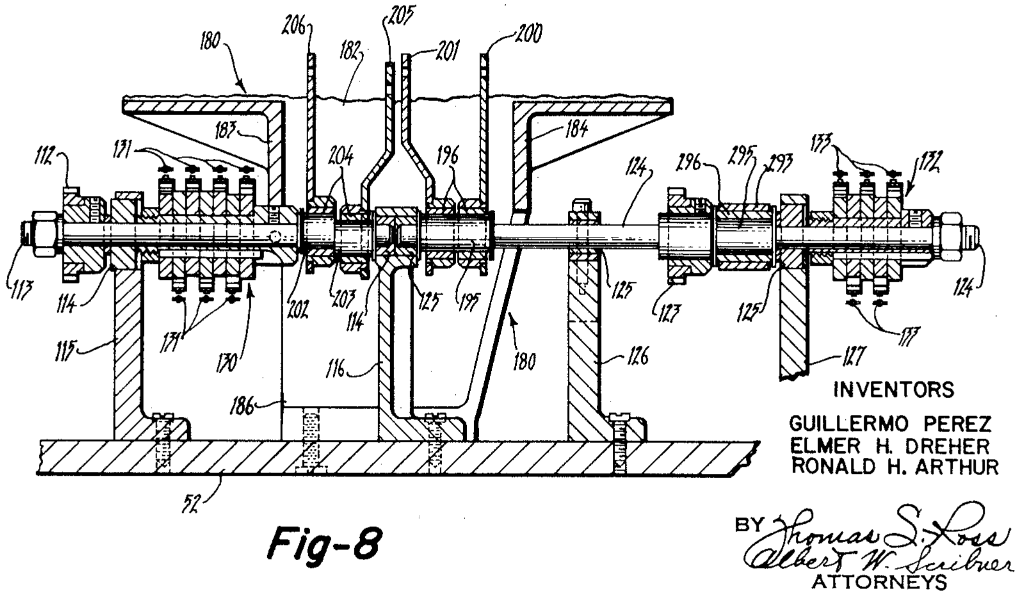
Figure 9:
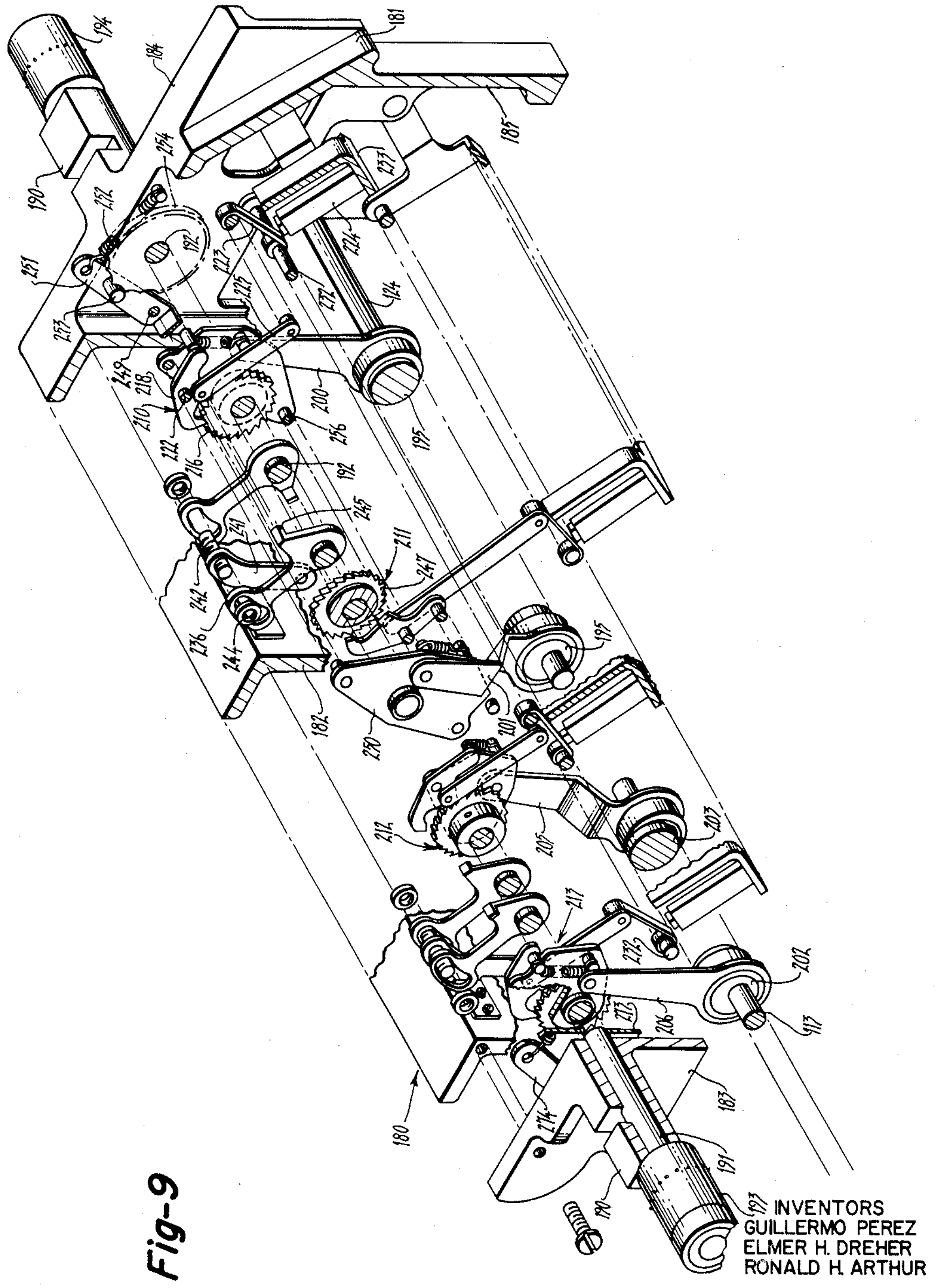
Figures 10, 11, 12, 13:
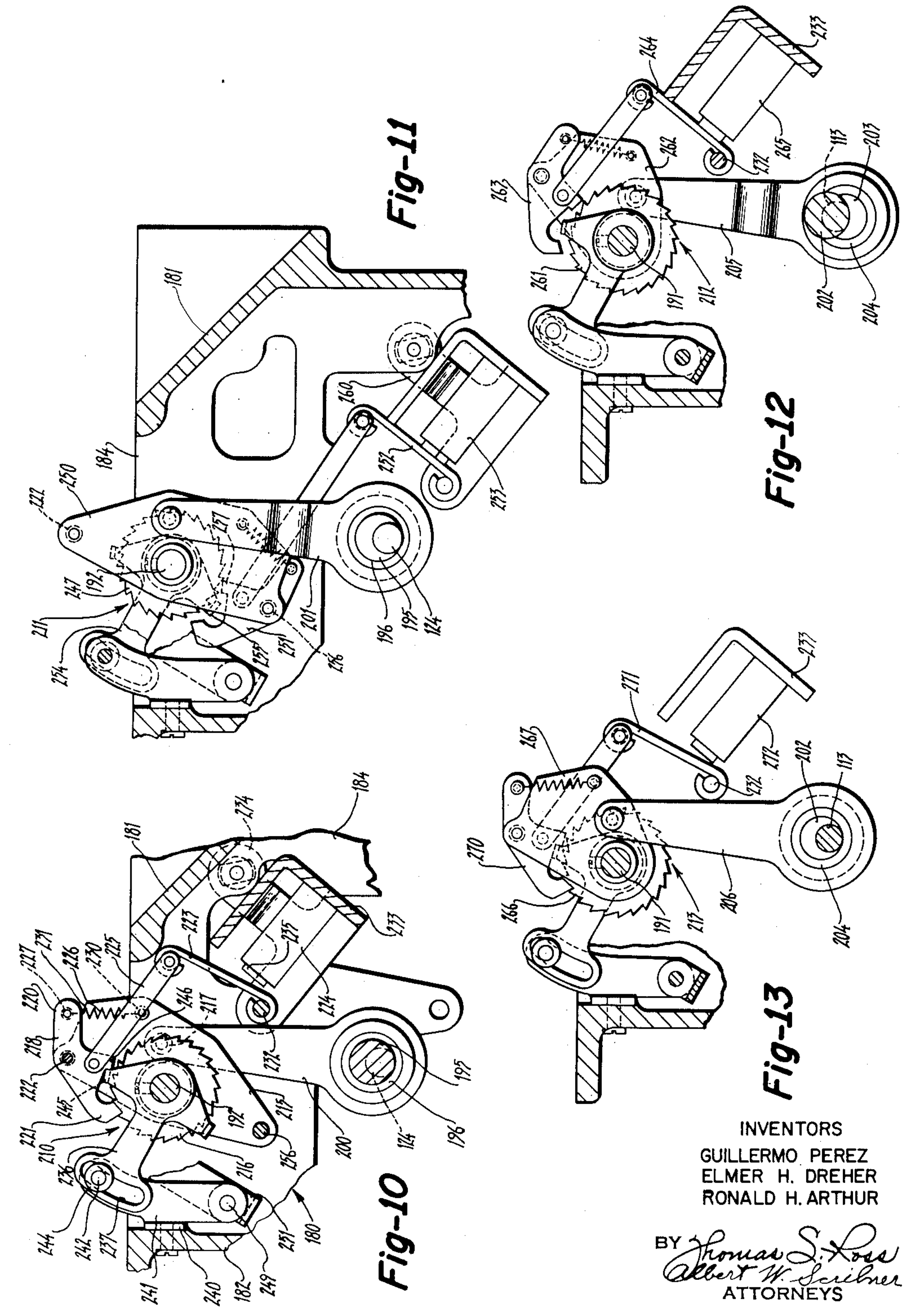
Figure 14:
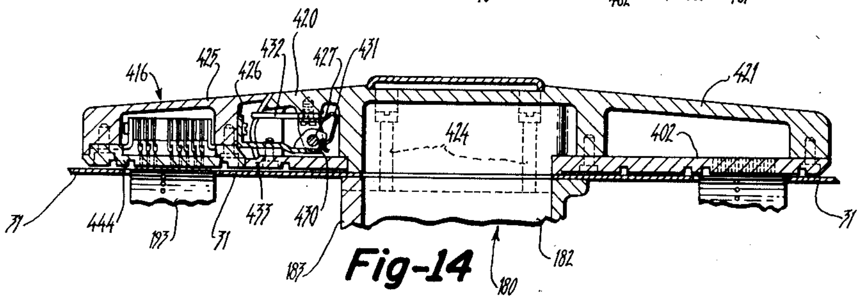
Figure 15:
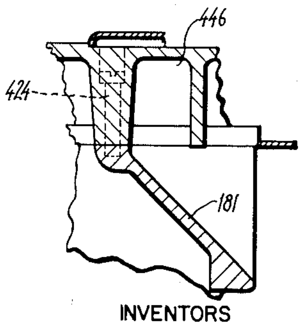
Figure 16:
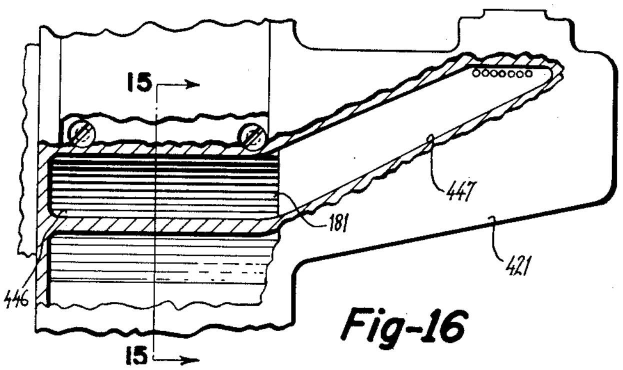

Figs. 4 and 5 are sectional views respectively taken along section lines 4—4 and 5—5 of Fig. 3;

Fig. 6 is a sectional side elevational view taken through lines 6—6 of Fig. 2;

Fig. 7 is a sectional side elevational view taken along sections line 7—7 of Fig. 2 and shows the reader mechanisms and the timing cams on the reader cam shaft;

Fig. 8 is an axial sectional view taken along lines 8—8 of Fig. 2 showing the reader and punch cam shafts and the tape feed drive arms associated therewith;

Fig. 9 is an exploded perspective view of the tape feed drive mechanisms for the reader-punch assembly;

Figs. 10 and 11 are each side elevational views in partial section showing respectively the forward and reverse feed mechanisms for driving the instant punch tape feed drum;

Figs. 12 and 13 are each side elevational views in partial section showing respectively the reader primary and secondary tape feed mechanisms;

Fig. 14 is a partial vertical sectional view of the punch and reading stations taken along lines 14—14 of Fig. 1;

Fig. 15 is a sectional view taken along lines 15—15 of Fig. 16.

Figure 19:
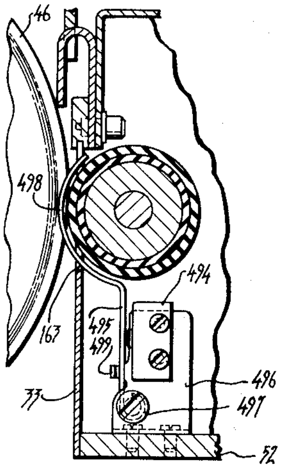
Figure 17:
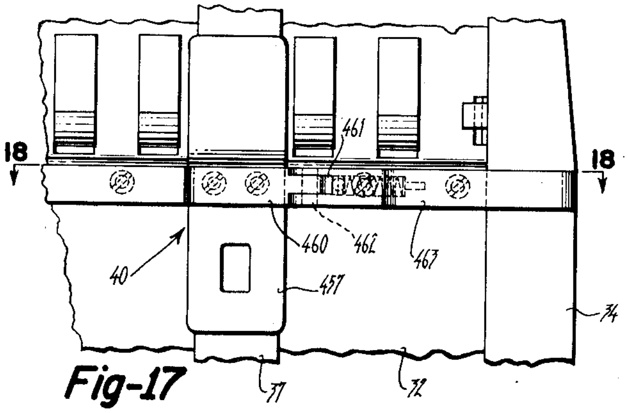
Figure 18:
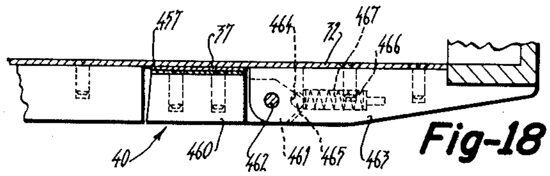
Figures 20, 21:
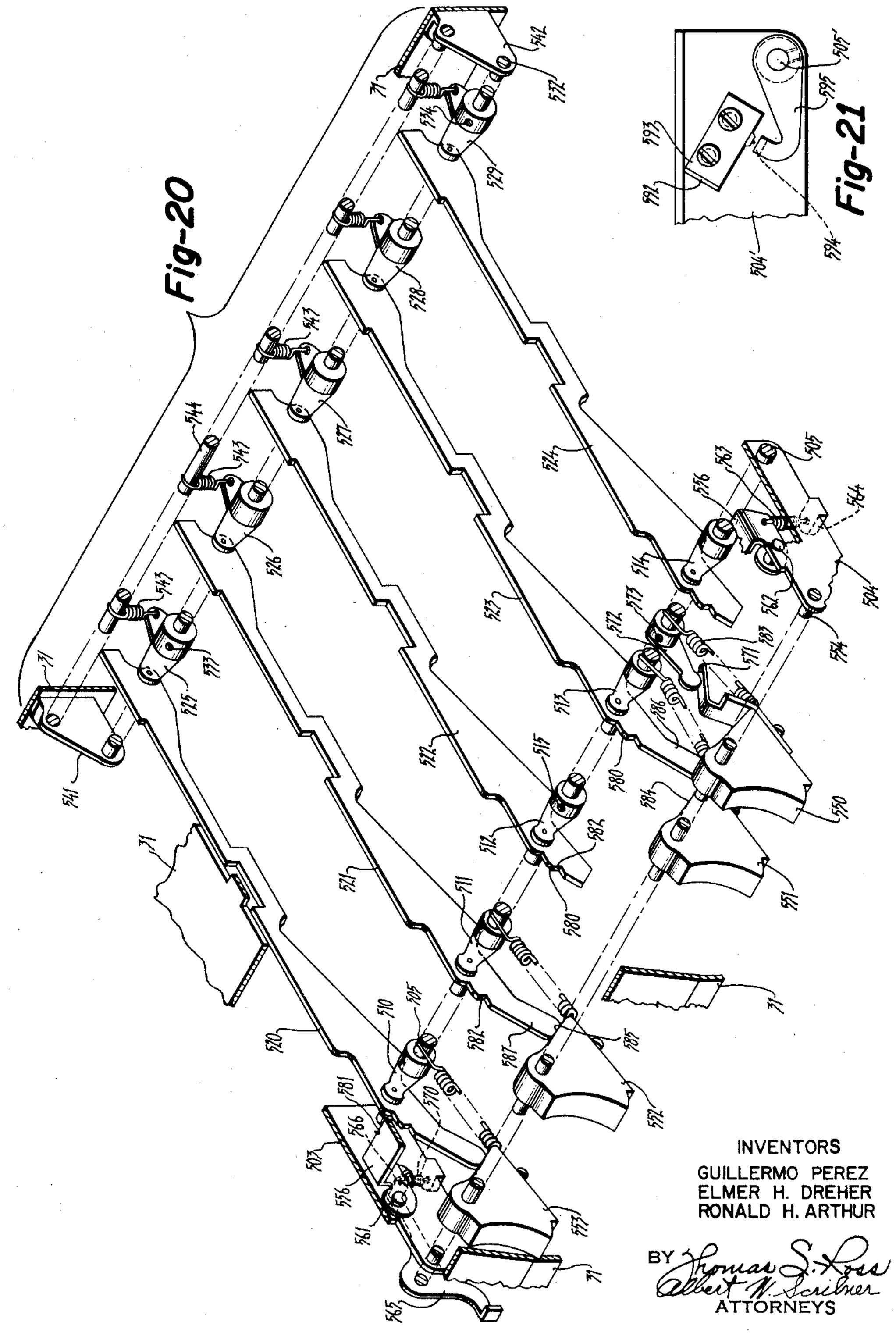
Figure 22:
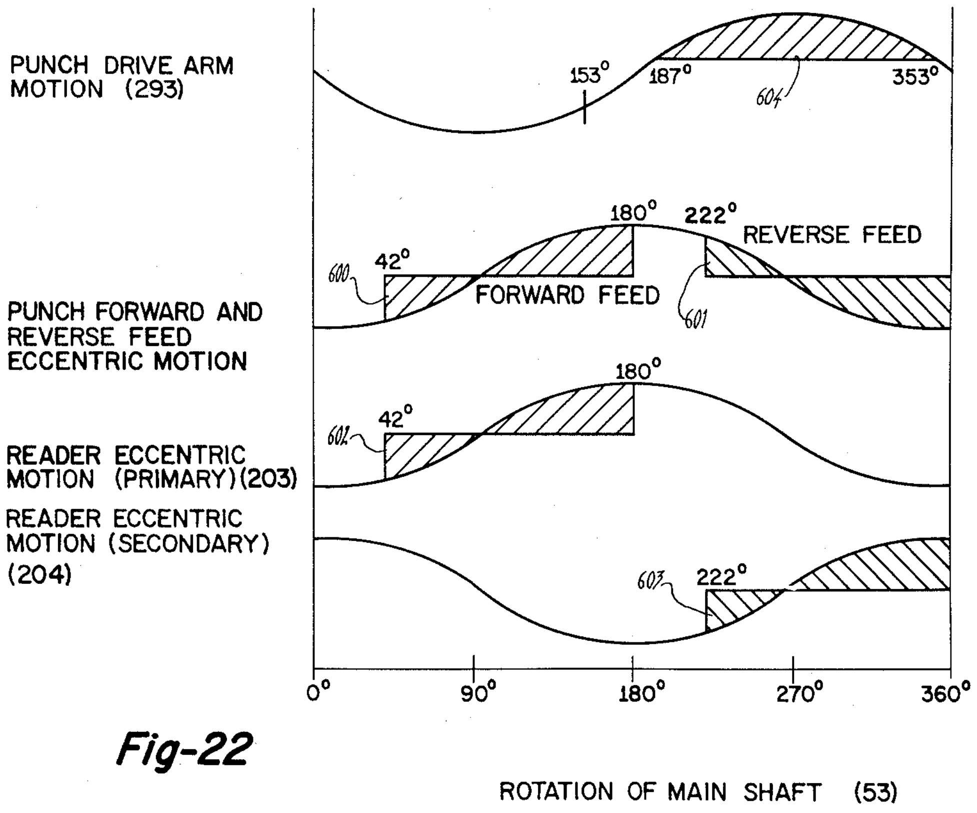

Fig. 16 is a fragmentary plan view with parts cut away of the punch-reader station casting showing the chad conducting cavities;

Fig. 17 is a fragmentary front elevational view showing the front portion of the punch record guide means;

Fig. 18 is a sectional view taken along section line 18—18 of Fig. 17;

Fig. 19 is a vertical sectional view taken along section line 19—19 of Fig. 2 showing reel-full-of-tape switch;

Fig. 20 is an exploded perspective view showing the construction and operating mechanism for the record guide means of the reader-punch assembly;

Fig. 21 is a fragmentary side elevational view showing switch means associated with the punch record guides of Fig. 20;

Fig. 22 is a diagrammatic view illustrating the relative operational timing of various parts in the reader punch unit.

Referring to Fig. 1 the reader punch unit 25 has a frame type housing generally designated by reference numeral 30 which comprises an inverted U-shaped cover 31, a front panel 32, a corresponding rear panel 33 (Fig. 6) and right and left side panels 34 and 35. The left hand section of the unit 25 houses the reader mechanism while the right hand section thereof houses the punch mechanism. A tape supply drawer 36 provided in the lower front of unit 25 contains a rotatably supported roll of tape 37 which is adapted to be fed upwardly through guide means generally designated by reference numeral 40, through a tape punch station generally designated by reference numeral 41 and onto a driven take-up reel 42. A punched tape 43 which is to be read is adapted to be fed through a guide means generally designated by reference numeral 44, through a read station generally designated by reference numeral 45 and onto a driven take-up reel 46. The lower edges 47 and 50 of the right and left side panels 34 and 35 engage the top of any suitable desk or the like and support the reader punch unit 25.

Referring to Fig. 2, which illustrates a partially sectioned plan view of the drive mechanism for the reader punch unit 25, most portions of the housing 30 having been cut away for the sake of clarity, there is shown a pair of vertically disposed support members 50 and 51 secured to the left and right side edges of a base 52. Support members 50, 51 and base 52 are adapted to support the housing and other elements as will hereinafter appear. The drive mechanism comprises a main drive shaft 53 which is rotatably mounted in bushings 54 (Fig. 3) fixedly retained in upstanding legs 55 and 56 and 57 and 60 of the reader and punch clutch support castings generally designated by reference numerals 61 and 62 respectively which are suitably secured to the base plate 52. The shaft 53 is adapted to be continuously rotated through a belt 64 which is driven by a suitable motor not shown.

The continuously driven main shaft 53 constitutes a common input or drive for a reader and a punch wrap spring clutch generally designated by reference numeral 65 and 66. When engaged the reader clutch 65 serves to drive the various hereinafter to be described movable parts of the reader, while the punch clutch 66 when engaged serves to drive the various hereinafter to be described movable parts of the punch. The construction and operation of the reader and punch clutches are the same and hence a detailed description of the reader clutch will suffice. Referring therefor to Figs. 3, 4 and 5 there is shown a driven member 67 rotatably mounted on the main shaft 53 by means of bushings 70 and 71 so that an outer cylindrical surface 72 thereof is coextensive with the outer cylindrical surface 73 of a flanged portion 74 of main shaft 53. A sleeve 75 and an output gear 76 are secured for rotation with driven member 67. Wrapped about surfaces 72 and 73 is a helical coupling spring 77. Rotatably mounted on shaft 53 is a disk 80 which, in combination with an axial extension 81 of sleeve 82 rotatably supports a sleeve 83, sleeve 82 being secured to driven member 67. The left end of the coupling spring 77 is secured by any suitable means to sleeve 83 while the right end thereof is secured to driven member 67. A clutch control disk 84 of noise dampening material, preferably nylon, is secured for rotation with sleeve 83 while a similar clutch control disk 85 is secured for rotation with sleeve 82. As shown in Figs. 4 and 5, the control disks are respectively formed with peripheral shoulders 86 and 87.

The spring 77 has a relaxed diametral dimension which is less than that for 72 and 73 so that when the spring is to be assembled in the clutch it must be radially expanded to a slight extent so as to thereby circumferentially grip cylindrical surfaces 72 and 73 of the driven sleeve 67 and the flanged main shaft 53. In that the hand of the helical spring is opposite the direction of rotation of shaft 53, rotation thereof will serve to tighten the grip of the spring 77 on cylindrical surfaces 72 and 73. Spring 77 is normally retained in a disengaged condition by relatively rotatably displacing the reader clutch control disks 84 and 85 in opposite directions so as to "unwind" the spring so as to thereby radially expand and move the same into operative engagement with the inner cylindrical surfaces 90 and 91 of sleeves 81 and 83. The disks 84 and 85 are respectively held so as to maintain the clutch disengaged by clutch latching armature 92 and latch member 93 (Figs. 4 and 5). As shown in Fig. 4, armature 92 is secured to an arm 94 which is pivotally mounted on a stud shaft 95 operatively supported in laterally spaced ears 96 formed on the said clutch support casting 61. A spring 100, operatively secured between the arm 94 and a spring mounting bracket 101 fixed to the upstanding leg 55 of clutch support casting 61, serves to rotatably bias armature 92 in a counterclockwise direction so that the upper end thereof remains in detenting engagement with the shoulder 86 of clutch control disk 84 thereby preventing it from rotating in a clockwise direction, Fig. 4. The latch member 93, Fig. 5, which prevents the control disk 85 from rotating in a counterclockwise direction is secured to an arm 102 which is pivotally mounted on a shaft 103 operatively supported in laterally spaced ears 104 formed on the clutch support casting 61. A spring 105 operatively connected between arm 102 and a bracket 106, Fig. 3, which is fixed to leg 56 of the clutch support casting 61, serves to rotatably bias latch member 93 in a clockwise direction, Fig. 5, so that the upper end thereof remains in detenting engagement with the radial shoulder 87 formed on the periphery of disk 85.

In order to engage the reader wrap spring clutch 65 of Fig. 2 armature 92 is displaced in a clockwise direction against the action of spring 100 upon energization of a reader clutch solenoid 110 with which it is associated and which is fixedly mounted by a bracket 111 to the clutch support casting 61. As long as the solenoid 110 is energized armature 92 will remain out of operative engagement from the shoulder 86 of control disk 84 thereby rendering the spring 77 free to radially contract and thereby operatively couple the main shaft 53 with the driven member 67. In this engaged condition of clutch 65 the various parts thereof such as the main drive shaft 53, driven member 67, sleeves 82 and 83 and control disks 84 and 85 will rotate together in a clockwise direction, Figs. 4 and 5 and latch member 93 will idly ratchet over control disk shoulder 87. When it is desired to disengage the reader clutch 65 the solenoid 110 will be deenergized thereby permitting its armature 92 to be moved into the path of and to operatively engage said shoulder 86, to thereby arrest the rotational movement of the control disk 84 and the left end, Fig. 3, of the spring 77. The rotational inertia of the driven parts will cause the driven member 67 and its associated sleeve 82 to continue their rotary motion for a short period of time after the deenergization of solenoid 110, and such will cause the right hand end of spring 77 to rotate relative to the now stationary left end of the spring. This relative rotation will cause the coils of spring 77 to unwrap and to radially expand so as to move out of coupling engagement with cylindrical surfaces 72 and 73 and into braking engagement with the respective inner cylindrical surfaces 90 and 91 of the sleeves 82 and 83. In this disengaged condition of clutch 65, armature 92 and latch member 93 will retain the wrap spring 77 in its radially expanded condition.

Referring again to Fig. 3 the output gear 76 of clutch 65 is adapted to mesh with a gear 112 secured to a reader cam shaft 113 which is rotatably mounted in bushings 114 (Fig. 8) fixedly retained in upright brackets 115 and 116 secured to the base plate 52.

The punch wrap spring clutch 66, Fig. 2, operatively connected to and driven by the right end portion of the main shaft 53 as heretofore stated is constructed and operated in a manner similar to that just described for the reader clutch 65; punch clutch 66 being associated with a punch clutch solenoid 121 and an output gear 122 corresponding to the reader clutch solenoid 110 and output gear 76. The output gear 122 of punch clutch 66 is adapted to mesh with a gear 123 secured to a punch cam shaft 124 which is suitably journalled in the bushings 125 (Fig. 8) in upright brackets 116, 126 and 127 secured to base plate 52.

In order that punching, reading and feeding of the record may occur in predetermined timed relation there are provided on the reader and punch cam shafts a plurality of timing cams adapted to close associated circuit breakers at times related to predetermined rotational positions of the punch and reader cam shafts. As shown in Figs. 2 and 8, the reader cam shaft 113 carries seven timing cams generally indicated at 130 which are respectively associated with a set of circuit breakers 131 while the punch cam shaft 124 carries five timing cams generally indicated at 132 which are respectively associated with a set of circuit breakers 133. Circuit breakers 131 and 133 are suitably mounted by brackets 134 and 135, Fig. 7, supported on base 52. As will hereinafter appear from the timing diagrams the punch and reader cam shafts 113 and 124 may make one revolution in approximately 33⅓ milliseconds, i.e. they are driven at 30 revolutions per second by the main drive shaft 53.

Referring again to Figs. 2 and 7, the main drive shaft 53 also has a sprocket wheel 140 secured for rotation therewith which is adapted to rotatably drive a sprocket wheel 141 through an interconnecting chain 142. The sprocket wheel 141 is secured to a tape reel drive shaft 143 which is journalled in four brackets 144, 145, 146, and 147, which are supported by the base plate 52. Rotatably mounted on shaft 143 are reader and a punch tape reel drive drums 150 and 151, Fig. 2, respectively, which are adapted to be yieldably rotatably driven by a pair of spoked magnetic coupling members 152 and 153 that are secured for rotation with shaft 143. In that the support means and the drive means for each of the tape take-up reels 42 and 46 are similar only that for one need be discussed in detail here.

Referring to Figs. 2 and 6 the means for supporting the punch take-up reel 42 comprises a U-shaped bracket 155, having a pair of rearwardly extending parallel arms 156 and 157. Bracket 155 is detachably secured to the upper rear of the housing cover 31 by any suitable means. The outer ends of arms 156, 157 are formed so as to have angularly disposed camming surfaces 160 which are adapted to be engaged by axially extending central pivot stud shafts 161. Under these conditions the reel 42 will normally tend to move downwardly and to the right as seen in Fig. 6, so that its periphery frictionally engages the outer cylindrical surfaces of the tape reel drive drum 151 which extends through an aperture 163 formed in the rear panel 33 of the unit housing 30. As seen in Figs. 2 and 6 the punch reel drum 151 is provided with a plurality of axially extending and circumferentially spaced projections 164 whose inner cylindrical surfaces are radially spaced a very small distance from the outer peripheral surfaces of magnetized radial spokes 165 of the magnetic coupling member 153. The projections 164 and the magnetized spokes 165 comprise a slip-type magnetic clutch which yieldably couples the shaft 143 with drum 151. The drum 151 will be driven by main shaft 53 through the chain 142, shaft 143, and the magnetic member 153 so as to yieldably drive the punch tape take-up reel 42 to the extent permitted by the record thereby causing a constant winding tension to be applied to the tape as the latter feeds through the tape punch head and onto said reel 42. The supporting and driving means for the reader take-up reel 46, Fig. 2, is similar to that just described for punch take-up reel 42 and hence need not be further explained.

The mechanisms for intermittently feeding record tapes or cards through the reader and punch heads will be described with reference to Figs. 2, 8 and 9–13. Referring to Fig. 8 there is shown a cast support member, generally designated by reference numeral 180. The cast support member comprises a generally rectangular upper portion having a downwardly and forwardly inclined front side 181, Fig. 9, and upstanding flanged rear, left and right sides 182, 183 and 184 respectively. The cast support member is supported by and above the base plate 52 by upstanding legs 185 and 186, Figs. 2 and 8 integral with the rear and front sides of the rectangular upper portion of said member. Lateral extensions 190 integral with the left and right sides 183 and 184 respectively rotatably support axially aligned shafts 191 and 192 on which are respectively secured reader and punch tape feed drums 193 and 194 respectively.

As heretofore described with reference to Fig. 2 the main drive shaft 53 drives the reader cam shaft 113 and the punch cam shaft 124 through clutches 65 and 66 respectively. As seen in Figs. 8 and 9 the punch cam shaft 124 is formed with an eccentric circular flange 195 disposed within bushings 196 that are mounted in the hub portions of the respective lower ends of the forward and reverse tape feed drive arms 200 and 201 respectively whereby rotation of cam shaft 124 will synchronously move arms 200 and 201 through cyclic vertical strokes. The reader cam shaft 113 is formed with two eccentric circular flanges 202 and 203 which are respectively disposed in bushings 204 that are mounted in the hub portions of the respective lower ends of the primary reader tape feed drive arm 205 and a secondary reader tape feed drive arm 206. It is to be noted in Fig. 8 that eccentric flanges 202 and 203 are eccentrically disposed 180° apart whereby as the reader cam shaft 113 rotates, the primary and secondary drive arms 205 and 206 are respectively cyclically driven up and down 180° out of phase; the primary drive arm 205 initially being in the down position and the secondary drive arm 206 initially being in the up position of their respective cycles as shown in Figs. 8, 12 and 13.

The cyclic up and down movement of the forward and reverse drive arms 200 and 201 respectively, serves to rotatably drive the punch feed drum 194 in forward and reverse directions through two ratchet mechanisms generally designated by reference numerals 210 and 211 as will hereinafter appear with reference to Figs. 10 and 11. The cyclic up and down movement of the primary and secondary arms 205 and 206 serve to rotatably drive the reader feed drum 193 at either of two forward speeds through one or both of a pair of ratchet mechanisms, generally designated by reference numerals 212 and 213 as will hereinafter appear with reference to Figs. 12 and 13.

Referring now to Fig. 10 the forward punch tape feed ratchet mechanism 210 comprises an actuator 215 which is pivotally connected on the punch feed drum shaft 192 which has a ratchet wheel 216 secured thereto. The upper end of the forward tape feed drive arm 200 is pivotally connected to the actuator 215 by a stud 217. A forward tape feed pawl 218, rotatably mounted intermediate its tail end 220 and its toothed ratchet engaging end 221 to the actuator 215 as by a cross shaft 222, is coupled to the free end of an armature 223 with a solenoid 224 by a link 225. A pawl biasing spring 226 is connected between a stud 227 on the tail end of the pawl and a cooperating stud 230 on the actuator 215. The clockwise limit of rotation of the pawl 218 is determined by the engagement of stud 227 with an upper edge 231 of actuator 215. The armature 223 is pivotally supported by a horizontal shaft 232 fixedly supported at one end by a bracket 233. The solenoid 224 is also supported by the frame 233 which has an end extension 234 which is secured in any suitable manner to the side 184 of the control housing or support member 180.

Pivotally mounted on the punch feed drum shaft 192 is a stop lever 236 having an arcuate slot 237 formed in the outer end thereof. A bracket 240 is secured to an adjacent portion of the rear side 182 of the cast support member 180 and is provided with a vertically disposed rib 241 which fixedly supports a threaded stud 242 adapted to pass through slot 237 so that the stop lever 236 may be adjustably clamped to the bracket 240 by means of a nut 244. Stop lever 236 is further provided with a bent over ear 245 which overlies the upper teeth of the ratchet wheel 216 and lies in the arcuate path of travel of a depending lug 246 of pawl 218.

Referring to Fig. 9 there is shown a shaft 249 which is fixedly supported at its respective ends by rib 241 and the side frame portion 184, is adapted to rotatably support a bail 251. Bail 251 is biased in a clockwise direction by means of a spring 252, the clockwise limit of movement of said bail being determined by the engagement of a detent stud 253 fixed to the intermediate portion of the bail with the scalloped periphery of a detent wheel 254 fixed to the shaft 192. It will be apparent that the yieldably biased bail and the detent wheel cooperate to provide a plurality of predetermined rotationally indexed positions for the shaft 192 and feed drum 194. A similar yieldable detent unit is provided for the other sprocket drum 193 and associated shaft 191.

The operation of the forward feed mechanism of Fig. 10 is as follows. With the punch cam shaft 124 at rest the drive arm 200 is in its down position, the armature 223 is adjacent the pole piece 235, and the toothed ratchet engaging end 221 of the pawl 218 is biased out of engagement from the ratchet wheel 216. Rotation of cam shaft 124 will cause the drive arm 200 to go through an up-down cycle; the up position corresponding to 180° rotation of cam shaft 124. The upward movement of the drive arm 200 rotates the actuator 215 counterclockwise. During this action the pawl 218 which is linked to the armature 223 will be restrained if the solenoid 224 is energized, hence pawl 218 will rotate in a counterclockwise direction in response to the initial counterclockwise movement of actuator 215. When the drive arm reaches a position corresponding to 42° rotation of cam shaft 124 the toothed end 221 of the pawl engages the ratchet wheel as indicated at 600 in the timing diagram of Fig. 22. Continued rotation of cam shaft 124 to the 180° position shown in Fig. 10 further rotates the actuator in a counterclockwise direction whereby pawl 218 will lock with and displace the ratchet wheel through an arcuate distance equal to the circumferential pitch of the ratchet teeth, thereby advancing the feed drum 194 one increment. As is apparent after the toothed end of the pawl engages the ratchet wheel and while the pawl is rotating the ratchet wheel no further relative motion of the pawl and actuator can occur. Hence during the interval corresponding to 42–180° rotation of cam shaft 124 the armature 223 will be forcibly withdrawn from the solenoid pole piece 235; solenoid 224 being deenergized at a time corresponding to 165° rotation of cam shaft 124 as will hereinafter appear. In that the instant punching apparatus is capable of speeds up to 30 cycles per second it will be apparent that the ratchet wheel 216 and the tape feed drum shaft 192 will be very rapidly rotated during said 42–180 degree interval and therefore could have sufficient inertia to carry past an extra tooth on the ratchet wheel 216. To avoid this possibility the stop lever 236 is adjusted so that the depending pawl lug 246 barely engages the bent over ear 245 when said actuator 215 reaches its position corresponding to 180 degrees of rotation of the cam shaft 124. Thus the toothed end of the pawl, after having indexed the ratchet wheel 216, will positively arrest the rotational movement thereof and the parts secured thereto since its counterclockwise rotation is prevented by the engagement of the said pawl lug 246 and the ear 245. Under these conditions pawl 218 serves to brake as well as to actuate the ratchet wheel 216. After 180° rotation of cam shaft 124 the actuator 215 begins a clockwise rotation as the drive arm 200 moves down whereby the pawl 218 becomes disengaged from the ratchet wheel and is returned to its normal rotative position by the biasing spring 226; the shaft 192 being retained in the advanced position by the detent wheel 254.

If the solenoid 224 is not energized when the cam shaft 124 starts rotating, the pawl 218 will not rotate relative to the actuator during the upward movement of the drive arm 200; spring 226 holding said pawl in its normal position relative to said actuator. At 180° rotation of cam shaft 124 however, the lug 246 on the pawl will engage the bent over ear 245 on the stop lever 236 whereby it will rotate the pawl relative to the actuator causing its toothed end 221 to engage the ratchet wheel 216 (the position illustrated in Fig. 10). In that this occurs at 180° rotation of cam shaft 124, there will be no rotational indexing of the punch feed drum.

The ratchet feed mechanism 211 shown in Fig. 11 is provided as heretofore stated for intermittently driving the punch tape feed drum 194 in a reverse or clockwise rotational direction. This mechanism is similar in nature to that described with reference to Fig. 10 and comprises a reverse feed ratchet wheel 247 secured to shaft 192, an actuator 250, a pawl 251 mounted thereon, and an armature 252 associated with a solenoid 253 linked to the pawl. In Fig. 11 however the pawl 251 is mounted on the actuator 250 below the shaft 192 and a stop lever 254, similar to stop lever 236 is provided with a bent over ear 255 180° displaced from the ear on stop lever 236. The forward and reverse feed actuators 215 and 250 respectively are interconnected by cross shafts 222 and 256 as seen in Fig. 9. The reverse feed pawl 251 will therefore be operative to drive ratchet mechanism 211 during the clockwise movement of its associated actuator 250 rather than during its counterclockwise movement as is the case with the forward feed ratchet mechanism 210.

The operation of the reverse feed mechanism 211 is as follows. With the cam shaft 124 at rest, the reverse feed drive arm 201 is in its down position; the armature 252 is away from the pole piece of solenoid 253 and the pawl 251 is biased out of engagement with the reverse feed ratchet wheel 247. Rotation of cam shaft 124 will cause drive arm 201 to go through an up-down cycle; the up position corresponding to 180° rotation of cam shaft 124. The upward movement of drive arm 201 will move the actuator 250 counterclockwise to the position shown in Fig. 11 at which time the armature 252 will have moved to a zero air gap position adjacent the pole piece of solenoid 253. If the solenoid is energized the armature 252 will be restrained, and as the actuator moves clockwise due to the downward movement of drive arm, the pawl 251 linked to the armature 252 will be pivoted into engagement with the ratchet wheel 247 at a shaft position corresponding to 222° thereby locking with and rotatably driving the ratchet wheel over the remainder of the cycle, as indicated at 601 of the timing diagram of Fig. 22. As before an ear 255, when engaged with pawl 251, will serve to brake the rotational movement of the ratchet wheel 247. As seen most clearly in Fig. 11 the solenoid 253 and the rotatably mounted armature 252 are mounted on a support frame 260 which is also secured to the right side 184 of the cast support member 180.

Figs. 12 and 13 show the primary and secondary tape feed ratchet mechanism 212 and 213 associated with the reader feed drum shaft 191 which is adapted to be intermittently rotated in a counterclockwise direction at a first or a second predetermined speed by one or both of said ratchet mechanisms. The respective ratchet mechanisms 212 and 213 are similar in construction and operation to the ratchet mechanisms described with reference to Fig. 10. The primary ratchet mechanism 212 comprising a ratchet wheel 261, and an actuator 262 which carries a pawl 263 that is linked to an armature 264 of a solenoid 265. Secondary ratchet mechanism 213 likewise comprises a ratchet wheel 266 and an actuator 267 which carries a pawl 270 that is linked to an armature 271 of a solenoid 272. It is to be noted in Figs. 12 and 13 that the primary and secondary solenoids 265 and 272 and associated armatures 264 and 271 are mounted in the same support frame 233 and on the same support shaft 232 as the forward punch tape feed solenoid and armature. As heretofore stated the ratchet mechanism 212 and 213 are driven by a primary driven arm 205 and a secondary drive arm 206 which are simultaneously cyclically operated up and down by eccentric flanges 202 and 203 respectively formed on the reader cam shaft 113; said cyclic movement of the drive arm being 180° out of phase.

The operation is as follows. With the cam shaft 113 at rest, the primary drive arm 205 is in its down position as shown in Fig. 12, its associated armature 264 is in a zero air gap position with respect to the pole piece of its associated solenoid 265 and the pawl 263 is out of engagement with the ratchet wheel 261. Also with the cam shaft 113 at rest the secondary drive arm 206 is in its up position as shown in Fig. 13, its associated armature 271 is away from the pole piece of solenoid 272 and the pawl 270 is in engagement with ratchet wheel 266. As is apparent if the primary solenoid 265 is energized when the cam shaft 113 begins a cycle the ratchet wheel 261 will be driven by pawl 263 over an interval corresponding to 42°–180° rotation of the cam shaft as indicated at 602 of the timing diagram of Fig. 22. During the 0–180° rotation of cam shaft 113 the secondary drive arm 206 moves to a down position thereby causing its associated armature 271 to move to a zero air gap position at 180°. If the secondary solenoid 272 is energized at this time the movement of the secondary drive arm 206 back to its normal up position will cause pawl 270 to move ratchet wheel 266 one tooth over an interval corresponding to 222°–360° rotation of cam shaft 113 as indicated at 603 of Fig. 22. As seen in Fig. 9 the reader feed drum shaft 191 is also provided with a detent wheel 273, bail 274 etc. which cooperate to yieldably hold shaft 191 in a plurality rotatably indexed positions in a manner similar to that above described for the punch unit detent wheel 254.

Referring more particularly to Fig. 6 the punching mechanisms of the tape punch unit are shown in vertical section. The construction and operation of the punching mechanism may be similar to that shown and described in copending application Serial 681,534, filed August 8, 1957 for a Record Perforator and comprises a plurality of punch selecting solenoids, generally designated by reference numerals 275, which are compactly spaced and suitably mounted on and between two horizontally spaced vertical mounting plates 276, Fig. 2. The array of solenoids are all provided with armatures 277 which are pivotally mounted on bars 290 secured to and between the vertical mounting plates 276. The power means for operating the punches comprises a pair of spaced and generally Y-shaped actuator arms, generally designated by reference numeral 291 which are fulcrumed at their lower ends on a common shaft 292 secured to and between the vertical mounting plates 276. The actuator arms 291 are adapted to be cyclically driven between predetermined arcuate limits by a punch drive arm 293 rotatably coupled to a horizontal bar 294 secured to the actuator arms 291. The punch drive arm 293 is caused to oscillate laterally forward and back through the home positions shown in Fig. 6 by a circular flange 295 eccentrically formed on the punch cam shaft 124, Fig. 8. The flange 295 is disposed within a bushing 296 secured to one end of the drive arm 293. The upper portions of the actuator arms 291 are bifurcated thereby forming angularly disposed branches 311 and 312 respectively. The actuator arms mount between them a stop bar 313, a bell crank limit bar 314 connected to and between the rearwardly disposed branches 311 of the actuator arms, and a pawl carrier bar 315 connected to and between the forwardly disposed branches 312 of said actuator arms. A plurality of pawls 316 having upper and lower arms 317 and 320 respectively are rotatably mounted on the pawl carrier bar 315. The upper arms 317 of the pawls are rotatably connected to the ends of links 321, whose other ends are rotatably connected to the free ends of the armatures 277. The upper edges of the lower arms 320 of the pawls are each provided with notches 322 and the lower edges thereof are each provided with an ear 323. Pawl return springs 324 are connected between the ears 323 on the pawls and to a spaced anchor rod 325 secured to and extending between the spaced actuator arms.

A plurality of bell cranks 326 are rotatably mounted on a fulcrum bar 327 extending between the two spaced vertical mounting plates 276. The axis of the fulcrum bar 327 is vertically above and substantially coincident with the axis of the actuator arm fulcrum shaft 292. Each of the bell cranks 326 has a rearwardly extending arm 330 and a downwardly extending arm 331, the alternate rearwardly extending arms 330 of the bell cranks each being provided with a hole 332. The intermediate rearwardly extending arms are provided with ears 333 whereby bell crank return springs 334 connected between the holes 332 and ears 333 and the spring anchor rods 335, secured to and between the horizontally spaced vertical mounting plates 276, will not operationally interfere with one another. A bar 336 secured between mounting plates 276 serves to limit the counterclockwise rotation of the bell cranks. Cylindrical punches 337 provided with undercut lower portions are articulately mounted on each of the rearwardly extending arms 330 of the bell cranks, with the punches 337 vertically disposed in and guided by aligned holes in a guide block 401 secured between mounting plates 276. Included in the aligned array of punches is an index or feed punch whereby, as is understood in the art, a tape passing between the guide block and a die block 402 will be perforated with coded data and feed holes. The downwardly extending arms 331 of the bell cranks are provided on their lower edges with notches 403 which are respectively complementary to the notches 322 in the pawls 316. The rearwardly extending bell crank arms 330 are normally biased against the stop bar 336 by the bell crank return springs 334. The pawls 316 are also biased away from the bell cranks in a counterclockwise direction by the pawl return springs 324; the pawl stop bar 313 secured to and between the spaced actuator arms serving to limit the counterclockwise movement of said pawls. With the pawls 316 so biased, the armatures 277 of the solenoids 275 are held biased away from their associated pole pieces 404 because of the links 321 connected between the associated pawls and armatures. The timing of the energization of the solenoids 275 is shown at 604 of Fig. 22.

As is apparent the vertical mounting plates 276 are relatively closely spaced for compactness and are therefore provided with cutouts 405, Fig. 2, so as to permit the necessary movement of the punch selecting and powering mechanism therebetween. As seen in Fig. 6, the punch guide block 401 is disposed in an opening 406, formed in the cover 31 of the housing 30, with its upper surface coextensive with the surface of cover 31. For a detailed discussion of the operation of record punch of Fig. 6 reference may be made to the last above mentioned copending application.

Referring to Fig. 7 the reader feed drum 193 comprises a body portion 411 made from an electrical insulating material, preferably nylon and to which is secured an outer tubular electrically conductive jacket 412. Associated with the drum 193 is a common brush 413, the free end of which is adapted to ride on the conductive surface of the drum, and data readout brushes 414 the free ends of which are adapted to ride on a perforated tape to be read. The perforated tape 43 to be read will be fed beneath the data readout brushes by the feed mechanisms heretofore described, the sprocket pins on the cylindrical drum surface respectively engaging the tape feed holes thereby feeding the perforated tape through the machine as is understood in the art. Whenever any one or more of the data readout brushes encounters a punched hole in the record the tips of these several brushes will then engage the conductive outer cylindrical surface of said drum 193, which will thereby establish an electrical connection between said common brush 413 and said one or more brushes 414. As seen in Fig. 7 the reader common brush 413 is operatively supported by an electrically insulated bracket 415 which is secured to the left side 183, Figs. 8 and 9, of the central cast support member 180. The data readout brushes are mounted in a movable section 416, Fig. 14, of a casting generally designated by reference numeral 417, Fig. 1. Casting 417 is formed in the shape of a cross having lateral frame arms 420 and 421 and a forwardly extending arm 422, Fig. 1.

Referring to Fig. 14 the central portion of the casting is secured to the rear side 182 of the cast support member 180 and to the top of inclined front side 181, Fig. 15, of the cast support member as by screws 424. As shown in Fig. 14 the movable section 416 carries a data readout mounting block 425 to which is secured a bracket 426; the latter being articulately connected to said frame arm 420 by means of a suitable stud shaft 427. A camming edge 430 on the bracket adjacent pivot stud 427 cooperates with the free end of a flexible spring 431 that is secured to said lateral frame arm 420. Also fixedly secured to arm 420 is a horizontal stop bar 432 and a plate 433 which is in parallel spaced relation with respect to the upper surface of housing cover 31. A plate 444 is secured to the underside of movable section 416 with one end thereof normally abutting the outer end of plate 433. Plate 444 is provided with a hole 445, Fig. 7, whereby the data readout brush ends may extend therethrough to ride the tape being driven by the tape feed drum 193.

The underside of lateral frame arm 421, Fig. 14 has secured thereto the punch die block 402 which is spaced from the surface of housing cover 31 with the holes therein aligned with the holes in the punch guide block. As most clearly seen in Figs. 15 and 16 the lateral arm 421 is formed with a cavity 446 which is coextensive with a forwardly extending cavity 447. Cavity 446 is disposed above the inclined front side 181 of the cast support member 180 whereby as is understood in the art chad will flow from the die block 402 through cavities 447 and 446, down the incline and into a chad removal drawer 450 (Fig. 1).

Referring again to Fig. 1 the tape supply drawer 36 is slidably suspended between the side panels 34 and 35 of the punch reader unit housing 30 in any suitable manner. As seen in Fig. 6 a bracket 451 mounted on the bottom of the drawer rotatably supports a tape guide roller 452. A tape supply reel is horizontally disposed and rotatably supported in drawer 36 by any suitable means; the tape 37 thereon being progressively unwound and passed around a vertical guide post 453 fixed in said drawer, under said roller 452 and then rotated through 90 degrees about its longitudinal axis as it is moved upwardly through a gap 455 between the lower edge of the front panel 32 and the top front edge of drawer 36 and up along the outer surface of front panel 32. The tape then passes through the tape guide means 40 which exerts a slight longitudinal restraint to the feeding movement of said tape. Referring to Figs. 17 and 18, the guide means 40 comprises a vertically disposed plate 457 to which is centrally secured a block 460 provided with a tongue 461 that is pivotally mounted by means of a pin 462 to a horizontal rib 463, fixed to the front housing panel 32.

The tongue 461 is provided with a notch 464 that is adapted to be engaged by a detent ball 465 which is yieldably biased by a spring 466 seated in a hole 467 in said rib. It will be apparent that the guide plate 40 may be moved to and yieldably held in either an open or a closed position. In the closed position plate 40 will be held in overlying frictional contact with the tape 37 that is passing upwardly along the front panel 32. In the open position the tape 37 may be readily initially positioned beneath said vertical plate 457.

Referring again to Fig. 6, while passing through guide means 40, the tape 37 will pass between two registering apertures 470 and 471 respectively, which are formed in the guide plate 40 and front panel 32. In passing therebetween the tape maintains a spring biased movable contact arm 472 of a form C type (i.e. a single pole double throw type) "preliminary out of tape" switch 473 in one of its two operative positions. As soon as the last bit of tape has passed between apertures 470 and 471, the contact arm 472 will be free to move outwardly to the other of its two operative positions. Switch 473 is fixedly secured to the base plate 52 by means of a bracket 474. A form C type "punch tape tension" switch 475 having a movable contact arm 476 is fixedly secured to the housing cover 31 by a bracket 477. The end 478 of the contact arm 476 normally extends through an aperture 480 formed at the upper front corner of the housing cover 31. The tension normally exerted on the tape 37 in order to pull it through guide means 40 is not sufficient to move switch contact arm 476 from the indicated one of its two operative positions. If the tension on tape 37 becomes execssive however the movable switch contact arm 476 will move inwardly to the other of its two positions and effect circuit changes which may stop the operation of the apparatus.

A "final out of tape" form C type switch 481 comprising a movable contact arm 482 is secured, by a bracket 484, in a cavity 483 of the lateral arm 421 of casting 417. The end 485 of the movable contact arm 482 overlies an aperture 486 formed in the housing cover 31. Here, as long as there is any tape 37 passing beneath the movable contact arm, switch 481 will be maintained in one of its two positions. As soon as the last bit of tape passes over aperture 486 the movable contact arm will move to the other of its two positions and affect circuitry changes which may also stop the operation of the apparatus.

As further seen in Fig. 6 the rear side of lateral arm 421 of casting 417 is provided with a pair of laterally spaced depending brackets 487 (only one of which is shown) that are adapted to pivotally support a tape deflector plate 490. In its counterclockwise position an arcuate portion 491 of plate 490 cooperates with a portion of the periphery of the punch feed drum 194 so as to insure that the tape 37 in passing through the punch unit is always maintained in operative engagement with the feed drum 194. One of the side edges of the plate 490 is provided with a pair of mutually adjacent detent notches 492 which are adapted to be selectively engaged by a conventional type spring biased ball detent 493 operatively mounted in lateral arm 421. The tape deflector plate 490 may thus be moved to and yieldably held in both a clockwise or open position and a counterclockwise or closed position.

Referring to Fig. 19 switching means are provided for interrupting the operation of the reader-punch unit when either of the tape take-up reels 42 or 46 have a predetermined maximum desired amount of tape wound thereon. A form C type switch 494 having a movable contact arm 495 is fixed to a bracket 496 mounted on the reader-punch base 52. The movable contact arm 495 is pivotally mounted on bracket 496 by means of a stud 497 and extends upwardly and through the aperture 163 formed in the rear housing panel 33. An arcuate portion 498 of arm 495 extends between the axially spaced side discs of the take-up reels so that when a predetermined amount of tape has been wound on the reel, arm 495 will be pivoted in a clockwise direction thereby displacing the movable contact thereof from its normal position. The counterclockwise limit of movement of arm 495 is determined by the bent off ear 499 formed on the switch supporting bracket 496.

Referring again to Fig. 7 the tape reader mechanism is provided with a tape tension switch 475, a "final out of tape" switch 481 and a full reel switch (not shown) which are respectively similar to those just described for the tape punch mechanism.

As heretofore stated the instant reader-punch unit 25 may be used to punch or read record tapes or cards. Referring to the general illustration in Fig. 1 it will be noted that the top of the housing cover 31 has two sets 501 and 502, of five elongated slots formed therein which are respectively associated with the record reader and punch stations. Elongated guide members are adapted to be operatively disposed in each of said slots and, as will hereinafter appear, these guide members are capable of being respectively moved to elevated operative positions or to retracted inoperative positions. When record cards are to be read or punched the appropriate pair of guide members are moved to elevated positions so as to laterally guide the successive cards through the punching or reading station. Here only a predetermined longitudinal portion of each card will be punched and read as the cards move through said station, said portion having a width corresponding to that of a record tape.

Referring therefore to Fig. 20 which illustrates record guide means for the reader mechanism, there is shown a pair of spaced rearwardly extending brackets 503 and 504 which are suitably secured to the underside of the housing cover 31 and which rotatably supports a cross shaft 505. Mounted on shaft 505 are five radially extending lever arms 510, 511, 512, 513 and 514; the four arms 510, 511, 513 and 514 being rotatably mounted thereon while lever arm 512 is secured thereto by a set screw 515. The outer ends of said five arms 510–514 are respectively pivotally connected to the forward ends of record guide members 520, 521, 522, 523 and 524. The rearward ends of the guide members are respectively pivotally connected to the outer ends of radially extending lever arms 525, 526, 527, 528 and 529 which are mounted on a cross shaft 532; lever arms 526, 527 and 528 being rotatably mounted thereon while lever arms 525 and 529 are secured thereto by set screws 533 and 534 respectively. Shaft 532 is rotatably mounted by a pair of spaced forwardly extending brackets 541 and 542 suitably secured to the housing cover 31. The lever arms 525—529 are respectively biased in a counterclockwise direction, as seen in Fig. 20, by means of springs 543 which are anchored to a cross shaft 544 also mounted in brackets 541 and 542. In this way all of the guide members 520—524 are normally biased to their retracted or inoperative positions wherein the respective upper edges thereof are disposed below the surface of housing cover 31.

The means for selectively elevating the reader record guides to their respective operative positions comprises a manually operated tape guide control button 550 and three manually operable card guide control buttons 551, 552 and 553 which are pivotally mounted on a common shaft 554 supported by said brackets 503 and 504. The push buttons 550, 551, 552 and 553 extend through suitable apertures formed in the forward portion of the housing cover 31, so as to be accessible to an operator.

A bail 556 which is adapted to retain selected guide members in elevated or operative positions is pivotally mounted on the brackets 503 and 504 by studs 561 and 562. The bail is biased in a clockwise direction by a spring 563 which is anchored to a bent-off ear 564 of bracket 504. A bail release lever 565 is rotatably mounted on cross shaft 554 and has a rear bent-off ear 566 which extends through a suitable slot in bracket 503 and underlies the left hand arm portion of bail 556. Lever 565 is biased clockwise by a suitable spring 570. The forward or outer end of the release lever 565 extends through a suitable aperture in the forward side of the housing cover 31 so as to be readily accessible to an operator. It will be apparent that the bail 556 may be rotatably actuated in a counterclockwise direction by manually depressing release lever 565.

As seen in Fig. 20 the lower edge of tape guide control button 550 has secured thereto a finger 571 which extends rearwardly so as to underlie the outer end of a lever arm 572 which is rotatably secured to the cross shaft 505 by a set screw 573. When the tape guide push button 550 is depressed the finger 571 will cause lever arm 572 and shaft 505 to rotate in a clockwise direction. In that lever arm 512 is the only one of the five lever arms 510 and 514 which is secured for rotation with shaft 505 the clockwise motion of shaft 505 will cause arm 512 to swing the tape guide member 522 upwardly and rearwardly to an elevated position against the action of the associated spring 543 so that the upper edge of guide member 522 extends through its associated slot in the housing cover 31 as shown in Fig. 1. During the upward movement of guide member 522 an upper forward bevelled edge 580 thereof will engage the rearward edge 581 of bail 556 and will rotate the latter in a counterclockwise direction against the action of spring 563 until bail edge 581 clears the bevelled edge 580 of guide members 522 whereby spring 563 will urge bail 556 into a notch 582 in the guide member 522 formed just forwardly of bevelled edge 581. After this occurs the tape guide member 522 will remain held in this elevated or operative position against the action of its associated spring 543 and push button 550 will also remain depressed under the action of its associated spring 583. The other guide members 520, 521, 523 and 524 are also provided with corresponding bevelled edges 580 and bail engaging notches 582 which cooperates in similar fashion with said rearward edge 581 of bail 556.

The tape guide member 522 may be restored to its normal inoperative position by depressing the release lever 565 or one of the card guide control buttons. Depressing release lever 565 will lift the rear edge 581 of the bail 556 out of detenting engagement with notch 582 whereby the associated spring 543 may urge guide member 522 to its retracted position as shown in Fig. 20.

When the card guide control buttons 551 and 552 are depressed the rearward edges 584 and 585 respectively thereof will directly engage extensions 586 and 587 provided on the forward ends of said card guide member 521 and 523 and will thereby displace the particular guide member selected to its operative position releasing the bail from the notch 582 of a previously selected guide member. After the previously selected guide is restored to its inoperative position by the associated spring 543 the bail 556 will lock and hold the guide member 521 or 523 in a manner similar to that just described for guide member 522. Restoration of guide member 521 and 523 may be accomplished in the same manner as that just described for guide member 522.

Depression of push button 553 will serve to displace not only guide member 520 to its operative position but also will similarly elevate guide member 524 in that both of the rearwardly mounted lever arms 525 and 527 respectively of guide members 520 and 524 are secured for rotation with common shaft 532.

As is apparent therefore by selectively displacing the various guide members 520—524 to their respective elevated positions, a separate and appropriate guide means may be provided for various size records which are to be fed into the read station 45 of the reader punch unit 25.

It will be understood that the punch as well as the reader mechanism is provided with a set of record guides and operating linkages which are similar to that shown and described in connection with Fig. 20. In addition the record guide means associated with the punch mechanism has associated therewith a pair of identical form C card switches, generally designated by reference numerals 592 and 593 in Fig. 21, which are operated together by a bent over portion 594 of a movable contact arm 595 that is rotatably secured to the right hand end of a shaft $505^1$ which corresponds to shaft 505 of Fig. 20. These switches are secured to a bracket $504^1$ which corresponds to the bracket 504 of Fig. 20. It will be apparent that when the control or punch tape guide member 596, Fig. 1, which corresponds to the reader tape guide member 522, is elevated and retracted the accompanying rotation of the shaft $505^1$ will cause arm 595 to operate the movable contacts of switches 592 and 593 from one to another of their two operative positions. The switches 592, 593 are electrically connected so as to control the operation of that solenoid 275, Figure 6, which is associated with the feed hole punch element. When a record tape is being fed into the record punch station tape feed holes are successively punched in the tape. However, when the card guide members are elevated and record cards having prepunched feed holes therein are fed into the record punching station, said solenoid will be disabled by means of the operation of said switches 592, 593.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. A reader punch unit; comprising a frame, a main drive shaft rotatably supported on said frame, a record reading device and a record punching device mounted on said frame, a reader cam shaft and a punch cam shaft rotatably mounted in said frame, means driven by said punch cam shaft for operating said punching device, a plurality of electrical breakers mounted on said frame, means for operating said breakers in timed relation to the rotation of said main shaft, and individually operable means for respectively rotatably coupling said cam shafts to said main shaft.

2. Apparatus as defined by claim 1; additionally comprising a record feeding means for said punching device, and means for actuating said record feeding means in timed relation to the rotation of said main shaft.

3. Apparatus as defined by claim 2 wherein said means for actuating the record feeding means comprises selectively operable means for driving said feeding means in either operative direction.

4. Apparatus as defined by claim 1; additionally comprising a feed sprocket drum rotatably mounted in said frame, and means operated by said reader cam shaft for rotatably driving said drum.

5. Apparatus as defined by claim 4 wherein said means for driving said drum comprises selectively operable mechanisms for selectively driving said record feed drum at either of at least two forward speeds.

6. Apparatus as defined by claim 4; additionally comprising means for feeding a record through said punching device, and means for operating said record feeding means in timed relation to the rotation of said punch cam shaft.

7. A reader punch unit; comprising a frame, a main drive shaft rotatably mounted on said frame, a clutch operatively connected to said drive shaft, a cam shaft rotatably mounted on said frame and adapted to be driven by said main shaft through said clutch, a record punching device mounted on said frame and operated by rotation of said cam shaft, a record feed drum rotatably mounted in said frame, cyclically operated drive means actuated by said cam shaft and adapted to be rotatably coupled to said drum, means operable to control the rotative coupling of said cyclically operable means and said feed drum, a record reading device mounted on said frame, and means couplable to said main shaft for feeding a record through said reading device in timed relation to the rotation of the said main shaft.

8. A reader punch unit, comprising a frame, a main drive shaft rotatably mounted on said frame, a clutch operatively connected to said drive shaft, a cam shaft rotatably mounted on said frame and adapted to be driven by said main shaft through said clutch, a record reading device mounted on said frame, a record feed drum rotatably mounted in said frame, cyclically operated drive means actuated by said cam shaft and adapted to be operatively rotatably coupled to said drum, a solenoid actuated linkage operable to control the rotative coupling of said cyclically operated means with said feed drum, a record punching device mounted on said frame, and means couplable to said main shaft for operating said punching device in timed relation to the rotation of said main shaft.

9. A reader punch unit; comprising a frame, a main drive shaft rotatably mounted on said frame, a pair of tape take-up reels rotatably mounted on said frame, means operated by said main shaft for yieldably driving said reels and applying a tension to the record being taken up, a pair of main clutches operatively connected to said shaft, a pair of cam shafts rotatably mounted in said frame and adapted to be respectively driven by said main shaft through said clutches, a record reading device, means operated by one of said cam shafts for feeding a record tape through said reading device, a record punching device operated by the other of said cam shafts, means responsive to the operation of said other cam shaft for feeding a record tape through said punching device, and means for yieldably restraining the record being fed into at least one of said devices.

10. Apparatus as defined by claim 9; additionally comprising a plurality of electrical breakers supported on said frame, and means for actuating said breakers in timed relation to the rotation of said main shaft.

11. A reader punch unit; comprising a frame, a main drive shaft rotatably mounted on said frame, a tape reading device, means driven by said shaft for feeding a record through said reading device, a tape punching device, a clutch operatively connected to said main shaft, a cam shaft rotatably mounted in said frame and arranged to be driven by said main shaft through said clutch, a record feed drum rotatably mounted in said frame, a ratchet wheel operatively connected to said drum, a pawl cooperable with said ratchet wheel, an actuating linkage connected to said pawl and operated by said cam shaft, control means for controlling the operative engagement of said ratchet wheel and pawl during the operative strokes of the latter, a pair of record tape take-up reels rotatably supported on said frame and being respectively associated with said devices, and means driven by said main shaft for respectively yieldably rotating said take-up reels.

12. Apparatus as defined by claim 11 wherein the last mentioned means includes at least one magnetic slip clutch.

13. A reader punch unit; comprising a frame, a main drive shaft rotatably mounted on said frame, a reader cam shaft and a punch cam shaft rotatably mounted on said frame, means for respectively rotatably coupling said cam shafts to said main shaft, a record reading device mounted on said frame, means for feeding a record through said reading device, means actuated by said reader cam shaft for operating said record feed means, a record punching device mounted on said frame, means driven by said punch cam shaft for operating said punching device, means for feeding a record through said punching device, means actuated by said punch cam shaft for operating the record feeding means for said punching device, each of said record feeding means including a drum rotatably mounted in said frame, cyclically operated drive means actuated by the associated cam shaft and adapted to be rotatably coupled to said drum, and control means operable to control the rotative coupling of said cyclically operated means and said drum.

14. Apparatus as defined by claim 13; additionally comprising a plurality of electrical breakers supported on said frame, and means for operating said breakers in timed relation to the rotation of said main shaft.

15. Apparatus as defined by claim 14; additionally comprising a pair of record take-up reels rotatably mounted on said frame, and means operated by said main shaft for respectively rotating said reels.

16. Apparatus as defined by claim 15 wherein said reel rotating means includes at least one slip clutch.

17. A reader punch unit; comprising a frame, a main drive shaft rotatably mounted on said frame, a record reading device and a record punching device mounted on said frame, individually operable means for respectively feeding records through said reading and punching devices, at least one of said feeding means comprising a record feed sprocket drum rotatably supported by said frame, a ratchet wheel operatively rotatably connected to said drum, a pawl swingably mounted for cooperation with the toothed periphery of said ratchet wheel, cyclically operating means actuated by said main shaft adapted to swing said pawl through arcuate forward and reverse strokes about the periphery of said ratchet wheel, and a solenoid controlled linkage operable to control the engagement of said pawl with said ratchet wheel during said forward strokes.

18. Apparatus as defined by claim 17; additionally comprising an electrical switch supported by said frame and having an operating arm which is actuated in response to a predetermined amount of tension in the record being fed into at least one of said devices.

19. Apparatus as defined by claim 17; additionally comprising an electrical switch supported by said frame and having an operating arm which is actuated in response to the presence and absence of a record being fed into at least one of said devices.

20. Apparatus as defined by said claim 17; additionally comprising a recond ratchet wheel, pawl and cyclically operating means for rotating said drum, and a second solenoid controlled linkage operable to effectively connect and disconnect said second pawl and ratchet wheel.

21. Apparatus as defined by claim 20 wherein said second solenoid controlled linkage comprises a solenoid and wherein said cyclically operating means comprises a cam shaft.

22. Apparatus as defined by claim 20 wherein said pawls are arranged to be actuated and controlled individually and together whereby said drum may be driven in one rotative direction at either of two predetermined finite speeds.

23. Apparatus as defined by claim 20 wherein said pawls are actuated and controlled for respectively driving said drum in opposite rotative directions.

24. Apparatus as defined by claim 17 wherein each of said devices is provided with one of said record feeding means, the feeding means associated with said punching device being adapted to feed said record in either operative direction and the feeding means associated with reading device being adapted to feed said record in one operative at either of two speeds.

25. Apparatus as defined by claim 20 wherein each of said devices is provided with one of said record feeding means, the feeding means associated with said punching device being adapted to feed said record in either operative direction while the feeding means associated with reading device being adapted to feed said record in one operative direction at either of two speeds, an electrical switch supported by said frame and having an operating arm which is actuated in response to a predetermined tension in the record, and another electrical switch support by said frame and having an operating arm which is actuated in response to the presence or absence of a record moving into one of said devices.

26. A reader punch unit; comprising a frame, a main drive shaft rotatably mounted on said frame, at least one tape take-up reel rotatably mounted on said frame, means operated by said main shaft for yieldably driving said reel, a punch cam shaft and a reader cam shaft rotatably mounted in said frame, individually operable clutches for respectively coupling said cam shafts to said main shaft, a tape reading device mounted on said frame, means for feeding a record tape through said device in timed relation to the rotation of said main shaft, a tape punching device mounted on said frame, means for feeding a record tape through said punching device in timed relation to the rotation of said main shaft, at least one of said tape feeding means comprising a tape feed sprocket drum rotatably mounted on said frame, a ratchet mechanism for rotating said drum, means operated by the associated one of said cam shafts for driving said ratchet mechanism, and control means operable to selectively enable and disable said ratchet mechanism.

27. Apparatus as defined by claim 26; additionally comprising a plurality of electrical breakers mounted on said frame, and means for operating said breakers in timed relation to the rotation of said main shaft.

28. A reader punch unit; comprising a frame, a main drive shaft rotatably mounted on said frame, a punch cam shaft and a reader cam shaft rotatably mounted on said frame, individually operable clutch means for selectively coupling said cam shafts to said main shaft, a tape reading device mounted on said frame, means operated by said reader cam shaft for feeding a record tape through said reading device, a tape punching device mounted on said frame, means operated by said punch cam shaft for feeding a record tape through said punching device, means for yieldably applying a longitudinal tension to the tape leaving one of said devices, means for applying a longitudinal restraint to the tape entering said one device, means operatively sensitive to the presence of the tape entering said one device, and means operatively sensitive to a predetermined amount of tension which is applied to said tape by said restraining means.

29. A reader punch unit; comprising a frame, a main drive shaft rotatably mounted on said frame, a record reading device mounted on said frame, means for feeding a record through said reading device, a record punching device mounted on said frame, means for feeding a record through said punching device, a record guide means for at least one of said devices, said guide means comprising a plurality of guide elements each supported for movement to respective operative and inoperative positions, individually manually operable means for selectively moving said elements, and means for releasably retaining said elements in each of said positions.

30. Apparatus as defined by claim 29; additionally comprising switching means operative in response to the movement of at least one of said elements and adapted to control the operation of a portion of said punching device.

31. In a reader punch unit: a frame; a main drive shaft rotatably mounted on said frame; a punch cam shaft and a reader cam shaft rotatably mounted in said frame; individually operable clutches for respectively coupling said cam shafts to said main shaft; a record reading device mounted on said frame; means for feeding a record through said device in timed relation to the rotation of said main shaft; a record punching device mounted on said frame; means for feeding a record through said punching device in timed relation to the rotation of said main shaft; at least one of said record feeding means comprising a tape feed sprocket drum rotatably mounted in said frame, a ratchet mechanism for rotating said drum, means operated by the associated one of said cam shafts for driving said ratchet mechanism, and control means operable to selectively enable and disable said ratchet mechanism; a record guide means for at least one of said devices; said guide means comprising a plurality of guide elements each supported for movement to operative and inoperative positions, individually manually operable means for selectively moving said elements, means for releasably retaining said elements in each of said positions; a plurality of electrical breakers mounted on said frame; and means for operating said breakers in timed relation to the rotation of said main shaft.

32. Apparatus as defined by claim 31; additionally comprising at least one record take-up reel rotatably mounted on said frame, and means operated by said main shaft for yieldably driving said reel.

33. Apparatus as defined by claim 7; additionally comprising a drawer slidably mounted in said frame, and tape support and guide means in said drawer for supporting and guiding a record tape from said drawer into one of said devices.

34. Apparatus as defined by claim 8; additionally comprising a chad drawer slidably mounted in said frame, and chad conduit means operatively disposed between said punching device and said chad drawer.

35. Apparatus as defined by claim 12; additionally comprising an electrical switch supported by said frame and having an operating arm which is actuated in response to the winding of a predetermined amount of tape on at least one of said reels.

36. In a reader punch unit; comprising a frame, a main shaft rotatably mounted in said frame, a clutch operatively connected to said shaft, a cam shaft rotatably mounted on said frame and adapted to be driven by said main shaft through said clutch, a record punch device mounted on said frame and adapted to be operated by said cam shaft, means operated by said cam shaft for feeding a record through said punching device, means for applying a yieldable tension force to the record leaving said punching device, means for applying a yieldable restraining force to the record entering said punching device, and an electrical switch supported by said frame and having an operating arm which is actuated in response to a predetermined tension in the record disposed between said yieldable record restraining means and said punching device.

37. A reader punch unit; comprising a frame having a top cover, a main drive shaft rotatably mounted in said frame, a record reading device mounted on said frame, means for feeding a record through said record reading device, a plurality of parallel laterally spaced elongated slots formed in said top cover, a plurality of record guide members respectively associated with said slots and mounted on said frame for movement from inoperative positions located beneath the top surface of said cover to operative positions located above said surface, means normally biasing said members to inoperative positions, manually operable means for selectively moving said members from inoperative to operative positions, means for retaining said members in their respective operative positions, and means for releasing said retaining means so that said members may move from said operative positions to said inoperative positions under the action of said biasing means.

38. Apparatus as defined by claim 17; additionally comprising means for retaining said pawl in engagement with said ratchet wheel after the completion of an operative forward record feeding stroke of said pawl thereby preventing continued inertial rotative movement of said ratchet wheel and drum.

References Cited in the file of this patent

UNITED STATES PATENTS

| | | |
|---|---|---|
| 1,819,561 | Krell | Aug. 18, 1931 |
| 2,744,578 | Mallina | May 8, 1956 |